(12) United States Patent
Minemura

(10) Patent No.: US 7,512,802 B2
(45) Date of Patent: Mar. 31, 2009

(54) APPLICATION AUTHENTICATION SYSTEM, SECURE DEVICE, AND TERMINAL DEVICE

(75) Inventor: Atsushi Minemura, Tokyo (JP)

(73) Assignee: Panasonic Corporation, Osaka (JP)

( * ) Notice: Subject to any disclaimer, the term of this patent is extended or adjusted under 35 U.S.C. 154(b) by 627 days.

(21) Appl. No.: 10/788,523

(22) Filed: Feb. 27, 2004

(65) Prior Publication Data

US 2004/0172542 A1 Sep. 2, 2004

(30) Foreign Application Priority Data

Feb. 28, 2003 (JP) .......................... P. 2003-053362

(51) Int. Cl.
*H04L 9/00* (2006.01)
(52) U.S. Cl. .................. 713/176; 713/181; 713/187
(58) Field of Classification Search ................. 713/187, 713/176, 181
See application file for complete search history.

(56) References Cited

U.S. PATENT DOCUMENTS

| | | | |
|---|---|---|---|
| 5,721,781 A | | 2/1998 | Deo et al. |
| 6,219,439 B1 * | | 4/2001 | Burger ........................ 382/115 |
| 6,257,486 B1 * | | 7/2001 | Teicher et al. ............... 235/380 |
| 6,327,652 B1 | | 12/2001 | England et al. |
| 6,360,321 B1 * | | 3/2002 | Gressel et al. .............. 713/172 |
| 6,484,259 B1 * | | 11/2002 | Barlow ........................ 713/159 |
| 6,609,199 B1 * | | 8/2003 | DeTreville .................. 713/172 |
| 6,823,464 B2 * | | 11/2004 | Cromer et al. ................. 726/5 |
| 6,866,192 B2 * | | 3/2005 | Hosogoe et al. ............. 235/380 |
| 6,988,250 B1 * | | 1/2006 | Proudler et al. ................ 716/1 |
| 7,000,249 B2 * | | 2/2006 | Lee ............................. 726/20 |
| 7,174,457 B1 * | | 2/2007 | England et al. ............. 713/168 |
| 2002/0040936 A1 | | 4/2002 | Wentker et al. |
| 2002/0042879 A1 * | | 4/2002 | Gould et al. ................ 713/176 |

FOREIGN PATENT DOCUMENTS

CN 1205818 1/1999

(Continued)

OTHER PUBLICATIONS

Shingo chiba, "Development of Java Cards and Application to Mailer Systems", Mar. 2003, Interface Magazine, pp. 82-90, cited on p. 2 of the specification.
Japanese Office Action Dated Sep. 7, 2007.

*Primary Examiner*—Kambiz Zand
*Assistant Examiner*—Amare Tabor
(74) *Attorney, Agent, or Firm*—Pearne & Gordon LLP

(57) ABSTRACT

The present invention provides an application authentication system capable of authenticating an application on a terminal device, which does not have a secure information concealing area, by a secure device. In an application authentication system in which a secure device 10 fitted to a terminal device 30 that has no secure information concealing area authenticates an application 31 stored in the terminal device, the secure device 10 authenticates an application running means 33 stored in an unwritable area 302 of the terminal device, and also authenticates the application based on a process applied to the application 31 by the application running means to request an access to the secure device. Since the terminal authentication by the secure device and the application authentication executed within the terminal device are coupled in combination, the secure device can authenticate the application operated on the terminal device without the secure information concealing area.

12 Claims, 9 Drawing Sheets

FOREIGN PATENT DOCUMENTS

| | | |
|---|---|---|
| EP | 0 552 392 A1 | 7/1993 |
| EP | 1 113 407 A2 | 7/2001 |
| EP | 1 189 157 A2 | 3/2002 |
| EP | 1 223 565 A1 | 7/2002 |
| JP | 09-102020 | 4/1997 |
| JP | 11-175402 | 7/1999 |
| JP | 2001-312402 | 11/2001 |
| JP | 2002-344623 | 11/2002 |
| JP | 2003-005859 | 1/2003 |
| WO | 9716904 | 5/1997 |
| WO | 0135685 | 5/2001 |

* cited by examiner

APPLICATION AUTHENTICATION SYSTEM, SECURE DEVICE, AND TERMINAL DEVICE

BACKGROUND OF THE INVENTION

1. Field of the Invention

The present invention relates to an application authentication system in which a card application operated on a secure device (an IC card, or the like) can authenticate an application operated on a terminal device (a mobile terminal device, or the like). The present invention also relates to the secure device, and the terminal device. More particularly, the present invention provides the system, the secure device, and terminal device capable of realizing an authenticating process required when the application operated on the terminal device makes use of the secure device.

2. Description of the Related Art

In recent years, a secure device (such as the IC card, or the like) capable of securely storing the information is utilized in a variety of applications (such as the electronic commerce, the access management, the commutation ticket, and so on). In the future, it is expected the applications be broadened more and more by using practically a mobile function of a mobile terminal device, or the like.

FIG. 8 shows schematically a variety of services that will be carried out by executing an application operated on a mobile terminal device 30 while utilizing secure data stored in a secure device 10.

As set forth in following Non-Patent reference 1 ("Interface" 2003, March, The CQ Publishing Co., Ltd., pp. 82 to 90), the application (card application) operated in the secure device is formed by the programming language (such as Java (registered trademark), or the like) and is installed into the secure device. Such card application authenticates an external application that demands the utilization of the secure data stored in the secure device, and then accepts a command of the external application is after such card application verified the security.

However, the conventional secure device does not have an authenticating means for authenticating the application that is downloaded into a mobile terminal device. Therefore, such application being downloaded into the mobile terminal device cannot utilize the data stored in the secure device.

This is on the ground of following circumstances.

Normally, in the authenticating process to identify a person, it is checked whether or not a person knows information that only the identical person can know. And then, the person is authenticated as the identical person if the person knows the information. FIG. 9 shows schematically a behavior exhibited when a cross authentication according to this system is applied to a card application 11 of the secure device 10 and a terminal application (assume a Java (registered trademark) application described by the Java (registered trademark) language is used) 31 of the mobile terminal device 30. The secure device 10 having a function of saving secret data can hold secret information (a cryptographic key, or the like) in a tamper resistant area that is securely constructed by hardware. Meanwhile, since the security is required to permit the mobile terminal device 30 to deal with the secret information, the overall area 31 must be constructed to have a tamper resistance, or the area 31 must be authenticated by a tamper resistant area 35 that is provided to hold the secret information. In such situation, the cross authentication is established if the card application 11 and the Java (registered trademark) application 31 operated under control of an OS (or VM (Virtual Machine)) 32 of the mobile terminal device 30 can confirm the fact that they hold a common secret information mutually by exchanging their information.

However, actually the mobile terminal device 30 does not have the area in which the secret information can be stored securely. For this reason, the card application 11 cannot execute the cross authentication by using the common secret information. Therefore, the Java (registered trademark) application 31 downloaded into the mobile terminal device 30 could not utilize the data stored in the secure device up to now.

In such circumstances, in the situation that the secure device 10 is fitted to the mobile terminal device 30 to accept the service from a service server via a network, the service server that is authenticated mutually by the secure device 10 can utilize the data stored in the secure device 10, nevertheless the mobile terminal device 30 can fulfill only the role of a clay pipe to pass through the data until now. As a result, as shown in FIG. 8, such a system could not be implemented that the application of the mobile terminal device 30 reads/writes the data from/into the secure device 10 to execute a high level processing such as calculation, display, or the like.

SUMMARY OF THE INVENTION

The present invention has been made to overcome such problems in the prior art, and it is an object of the present invention to provide an application authentication system capable of authenticating an application on a terminal device that has no secure information concealing area by a secure device, and also provide a secure device and a terminal device constituting the system.

Therefore, according to the present invention, there is provided an application authentication system in which a secure device connected fixedly or detachably to a terminal device that has no secure information concealing area authenticates an application stored in the terminal device, wherein the secure device authenticates an application running means on the terminal device and also authenticates the application based on a process of an application executed by the application running means to request an access to the secure device.

Also, according to the present invention, there is provided a secure device connected fixedly or detachably to a terminal device and including a card manager for executing a process of authenticating the terminal device and a card application for applying an authenticating process to an access request application stored in the terminal device, wherein the card application authenticates the application based on a process that is applied to the application by the terminal device, then confirms that the process of authenticating the terminal device by the card manager is completed, and then accepts an access request of the authenticated application.

Also, according to the present invention, there is provided a terminal device including an application running means and an application, wherein the application running means calculates digest data of the application to request an access to a secure device after the fitted secure device authenticates the application running means, then authenticates the application by using the digest data, and then issues an access request to the secure device.

As a result, since the terminal authentication by the secure device and the application authentication in the terminal device are coupled in combination, the secure device can authenticate the application operated on the terminal device that does not have the secure information concealing area.

Figure 1:
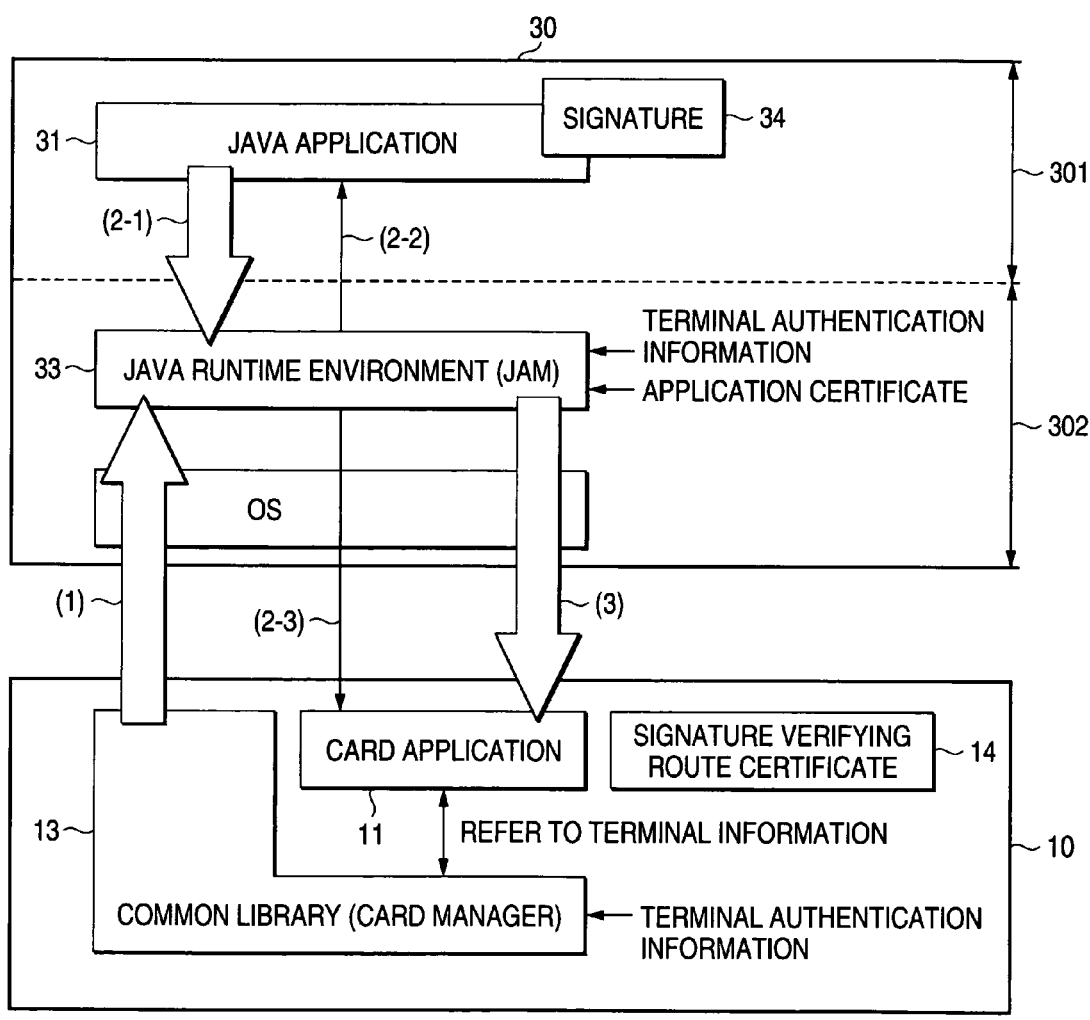
FIG. 1 is a block diagram showing procedures of an application authentication system according to a first embodiment of the present invention.

In the drawings, a reference numeral 10 refers to a secure device; 11 to a card application; 13 to a common library (card manager); 14 to a signature verifying route certificate; 15 to digest data; 30 to a mobile terminal device; 31 to a Java (Registered Trademark) application; 32 to an OS; 33 to a Java (Registered Trademark) runtime environment (JAM); 34 to an electronic signature; 35 to a secret information storing area; and 301 to an user's writable area; 302 to an unwritable area.

DETAILED DESCRIPTION OF THE PREFERRED EMBODIMENTS

First Embodiment

In an application authentication system according to a first embodiment of the present invention, in order to authenticate the terminal application operated on the mobile terminal device, the card application of the secure device verifies whether or not the terminal application is the normal application. When the card application could confirm that the terminal application is the normal application, such card application decides that the authenticating process is normally ended and then accepts an access request issued from the terminal application.

Figure 2:
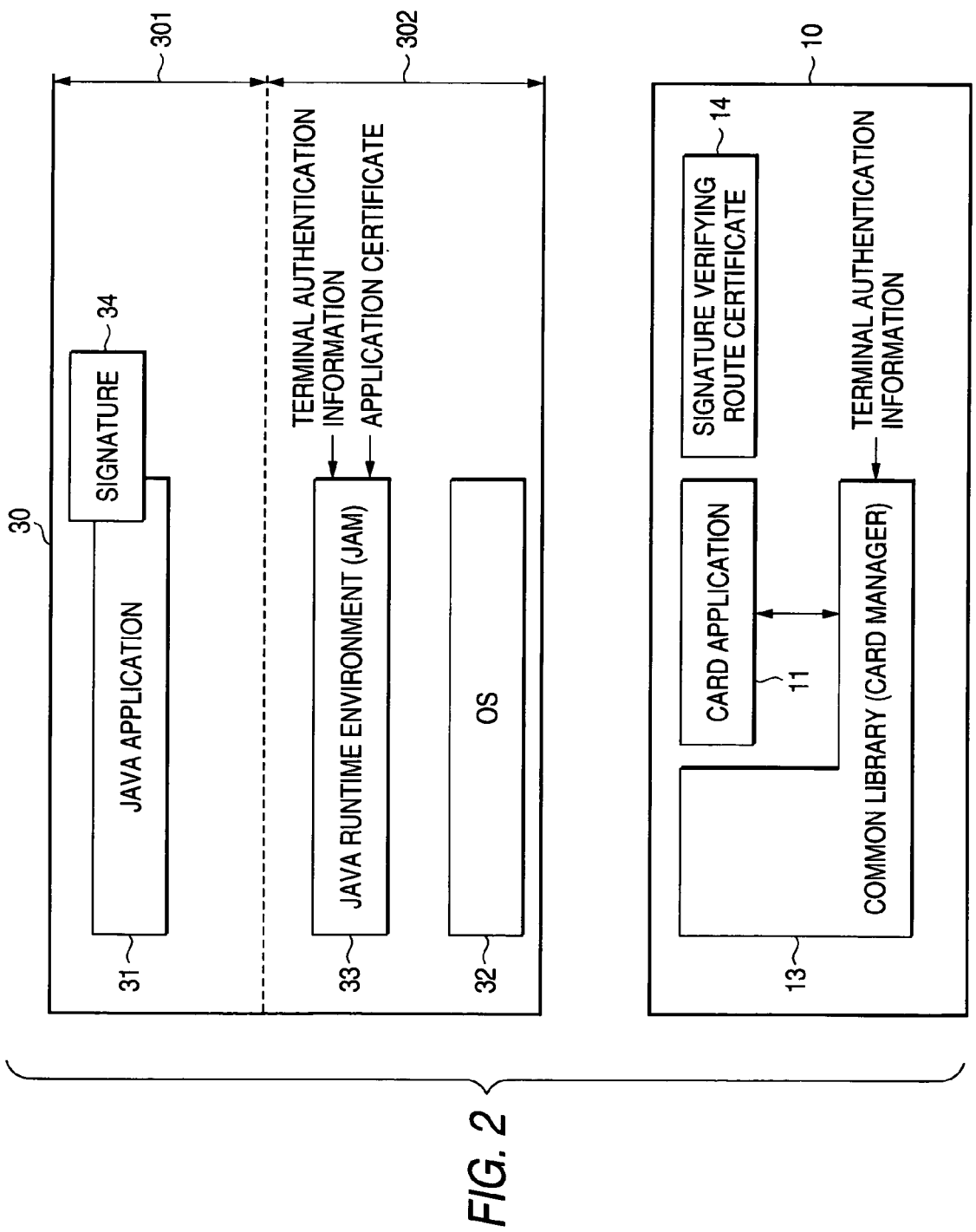
FIG. 2 is a block diagram showing a configuration of the application authentication system according to the first embodiment of the present invention.

FIG. 2 shows schematically a secure device 10 and a mobile terminal device 30 constituting this system. The mobile terminal device 30 has a "unwritable area 302" in which information cannot be written after the information are written into a ROM or a flash memory at the time of forwarding from the factory, and a "user's writable area 301" in which a downloaded application is written. A Java (registered trademark) application 31 to which an electronic signature 34 is attached is stored in the user's writable area 301. Also, an OS 32 and a Java (registered trademark) runtime environment (JAM) 33 used to run the Java (registered trademark) application 31, which is a computer program described by the Java (registered trademark) language and is stored in the unwritable area 302.

In this case, the "unwritable area 302" signifies an area in which the information stored therein are never rewritten by the operation on the terminal device (e.g., the application 31), the access from an external device (e.g., the card 10), or the like. It does not matter whether the area itself has a physically unwritable mechanism (e.g., ROM) or not.

The electronic signature 34 in the Java (registered trademark) application. 31 is attached by the certificate authority that certificates a validity of the Java (registered trademark) application 31. Digest data are generated by applying the Hash operation to the data of the Java (registered trademark) application 31, and then such electronic signature 34 is generated by encrypting the digest data by using a secret key of the certificate authority.

Also, a terminal authentication information that the mobile terminal device 30 uses to execute the cross authentication with the secure device 10 and an application certificate of the certificate authority to contain a verifying public key of the electronic signature 34 are input into the JAM 33. (Here, the wording "being input" signifies that respective information can be embedded in the JAM 33 as a code, or can be picked up as a file as the case may be).

Meanwhile, the secure device 10 has a common library (card manager) 13 used to execute the authenticating process of the mobile terminal device 30, a card application 11 used to execute the authenticating process of the Java (registered trademark) application 31 operated on the mobile terminal device 30, a signature verifying route certificate 14 used to verify a public key of the certificate authority.

Also, the terminal authentication information that the secure device 10 uses to execute the cross authentication with the mobile terminal device 30 is input into the card manager 13. (Here, the wording "being input" signifies that respective information can be embedded in the card manager 13 as a code, or can be picked up as a file as the case may be).

In this case, in the present invention, it is required to authenticate the mobile terminal device 30 by the mobile terminal device 30, but it is not always required to authenticate the secure device 10 by the mobile terminal device 30. In respective embodiments, the case where the "cross authentication" is applied between the secure device 10 and the mobile terminal device 30. In this case, the cross authentication is not indispensable and the "one-sided authentication" by which the secure device 10 authenticates the mobile terminal device 30 may be applied.

Procedures required until the card application 11 of the secure device 10 authenticates the Java (registered trademark) application 31 operated on the mobile terminal device 30 in this system are shown in FIG. 1 by using arrows.

When the secure device 10 is fitted to the mobile terminal device 30, the card manager 13 of the secure device 10 executes the cross authentication process with the JAM 33 of the mobile terminal device 30 by using respective terminal authentication information (1). If the cross authentication is established, the card manager 13 sets a flag indicating the success (cross authentication path flag) in the secure device 10.

In this case, various terminal authentication systems using the secure device are known, and any of these systems may be employed in this system. For instance, the secure device may authenticate the BIOS (Basic Input Output System) by using the TCPA (Trusted Computing Platform Alliance) system, then such BIOS may authenticate the OS, and then such OS may authenticate the Java (registered trademark) runtime environment. Also, in the case of the mobile terminal device having the tamper resistant SIM card or the secure LSI, the challenge and response system may be employed. In short, any system may be employed if the authentication of the normal terminal can be established, and it does not matter at all that the binding system for the particular device is employed.

The JAM 33 of the mobile terminal 30 starts an accessing function to the secure device 10 if such JAM 33 succeeds the cross authentication with the secure device 10, while the Java (registered trademark) application 31 requires the access to the secure device 10 of the JAM 33 (2-1). The JAM 33, when accepts this requirement, verifies the electronic signature 34 of the Java (registered trademark) application 31 by using the public key contained in the application certificate, whereby the Java (registered trademark) application 31 is authenticated (2-2).

The verification of the electronic signature 34 is carried out by applying the Hash operation to the data of the Java (registered trademark) application 31 to generate the digest data and then comparing the digest data with the data obtained by decoding the electronic signature 34 by using the public key. In case these data coincide with each other, the JAM 33 can authenticate the validity of the Java (registered trademark) application 31 and can check that the data are not tampered.

The JAM 33, after authenticated the Java (registered trademark) application 31, presents the generated digest data and the electronic signature 34 of the Java (registered trademark) application 31 to the card application 11 of the secure device 10 (2-3). In response to this, the card application 11 decodes the electronic signature 34 by using the public key derived from the signature verifying route certificate 14, and then verifies a coincidence with the digest data fed from the JAM 33. The JAM 33, after authenticated the Java (registered trademark) application 31, executes the access request issued from the Java (registered trademark) application 31, and then transmits a command to the card application 11 (3). The card application 11 that succeeded the verification of the digest data confirms that the device authentication by the card manager 13 has been completed via the cross authentication path flag, and then accepts the command.

In this fashion, the secure device of the application authentication system authenticates the application by confirming the fact that the application operated on the mobile terminal is the normal application. Then, in order to achieve this confirmation, in the first stage, the validity of the Java (registered trademark) runtime environment (application running means) stored in the unwritable area of the mobile terminal is confirmed. Once this confirmation is obtained, it is impossible to rewrite the application running means and therefore the reliability of the application running means is still continued subsequently.

In the second stage, the application running means that had the confidence of the secure device in the mobile terminal device authenticates the application with the electronic signature, and then delivers the digest data and the electronic signature of the application to the secure device.

The secure device decides the digest data delivered immediately after the generation from the application running means, in which the secure device puts confidence, as the reliable data. In the third stage, the secure device verifies the digest data by using the electronic signature.

If this verified result is normal, the secure device can confirm that the application operated on the terminal device is the normal application, based on the authenticating processes in the first stage, the second stage, and the third stage.

In this manner, this application authentication system makes it possible for the secure device to authenticate the application that has no secure information concealing area on the terminal device, based on a series of authenticating processes in the first stage, the second stage, and the third stage.

Second Embodiment

In a second embodiment of the present invention, an application authentication system composed of a secure device in which the authentication information to identify the application is stored and issued and a mobile terminal device on which the application is operated will be explained hereunder.

Figure 8:
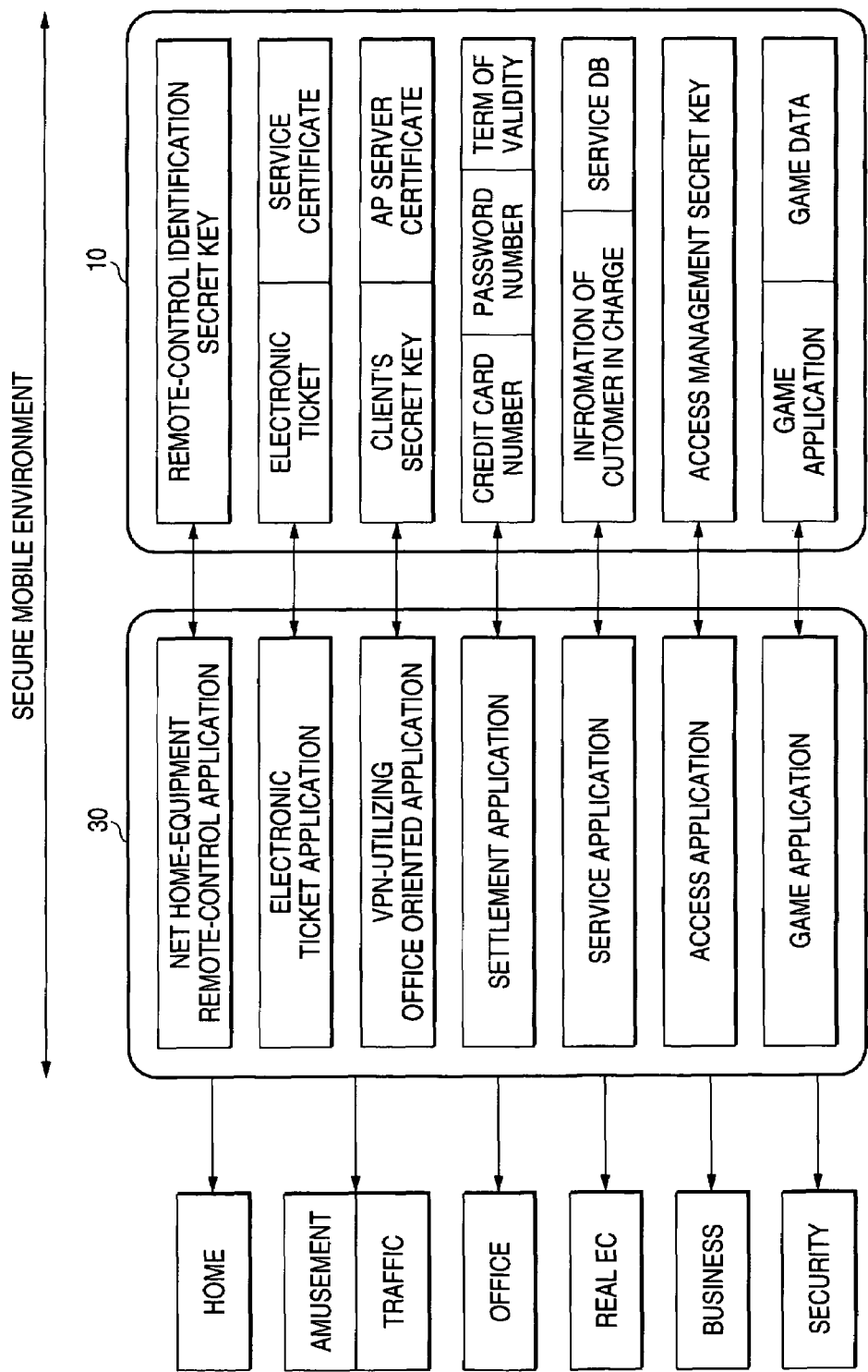
FIG. 8 is a schematic diagram view showing services that can be carried out by a mobile terminal device to which a secure device is fitted.
Figure 9:
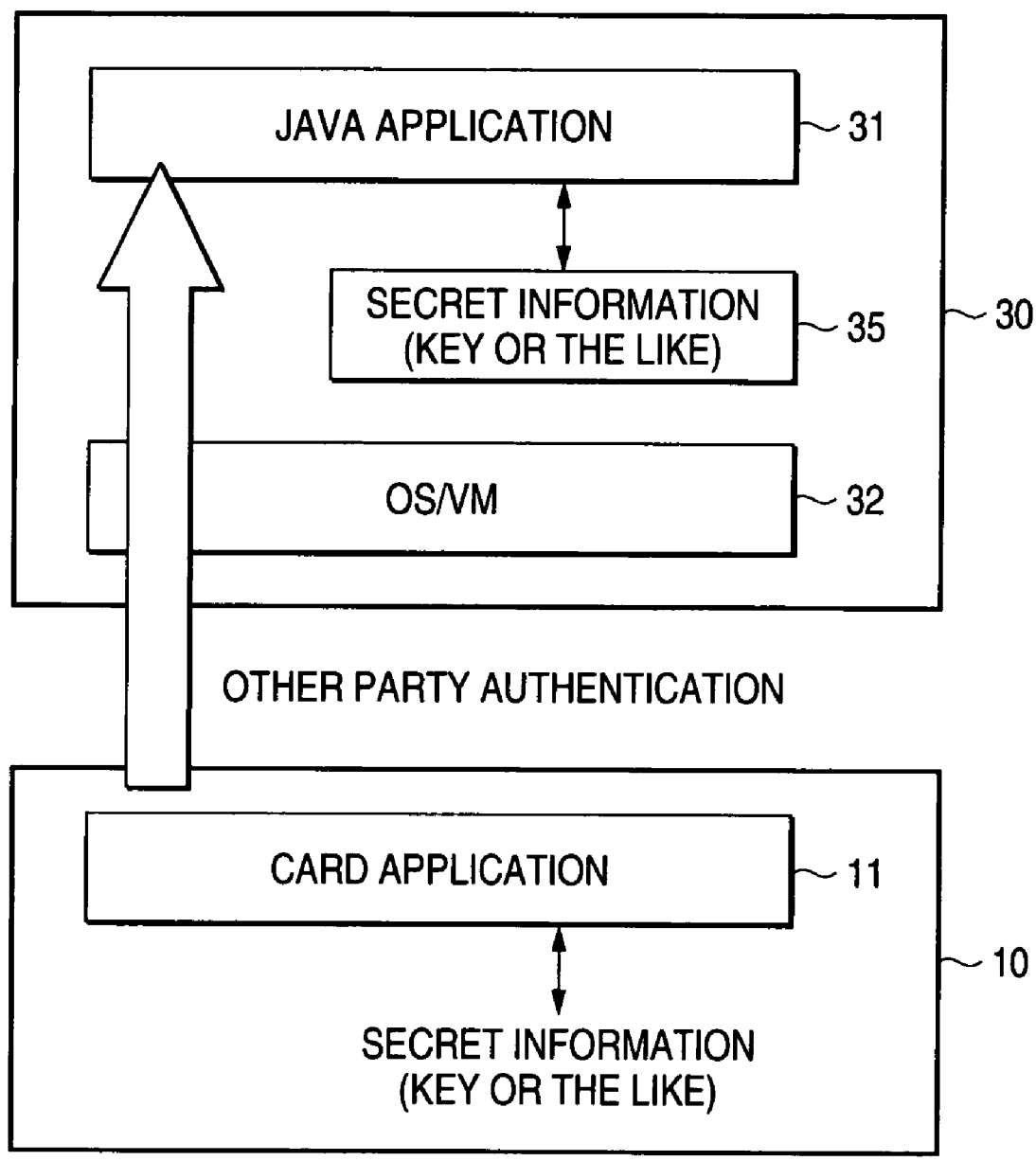
FIG. 9 is a block diagram showing a problem caused when the secure device authenticates the application on the mobile terminal device.

This secure device is constructed in combination with the application, which is downloaded into the mobile terminal device, to realize various services. For instance, in case an "electronic ticket application" shown in FIG. 8 is downloaded into the mobile terminal device 30, it is of course that the secure device 10 is a secure device for the electronic ticket.

Figure 4:
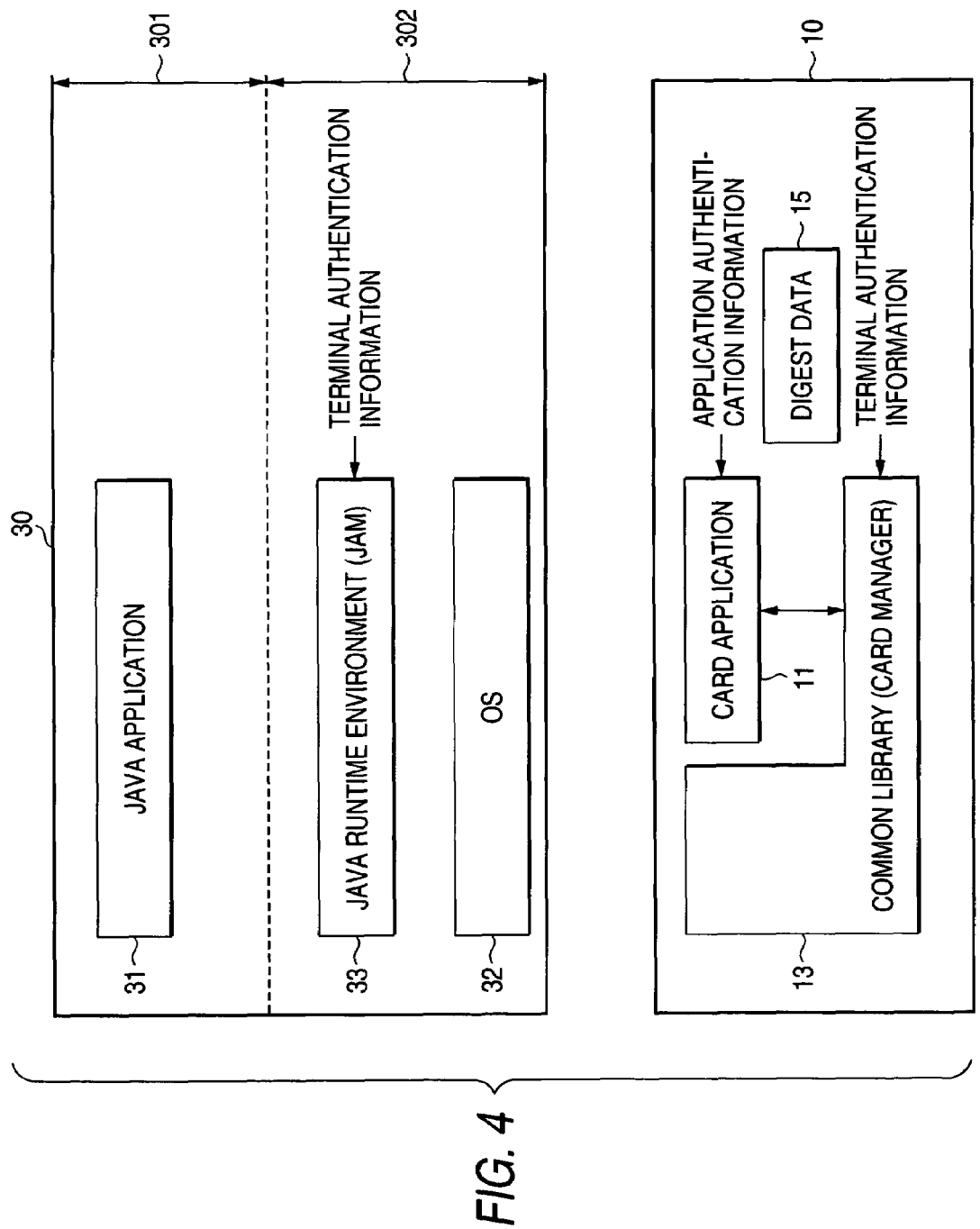
FIG. 4 is a block diagram showing a configuration of the application authentication system according to the second embodiment of the present invention.

FIG. 4 shows schematically the secure device 10 and the mobile terminal device 30 constituting this system.

The Java (registered trademark) application 31 stored in the user's writable area 301 of the mobile terminal device is 30 has no signature. Therefore, there is no input of the application certificate into the JAM 33. Also, the application authentication information such as digest data 15, or the like to identify the Java (registered trademark) application 31 is stored previously in the secure device 10. Remaining configurations are not changed from the first embodiment.

Figure 3:
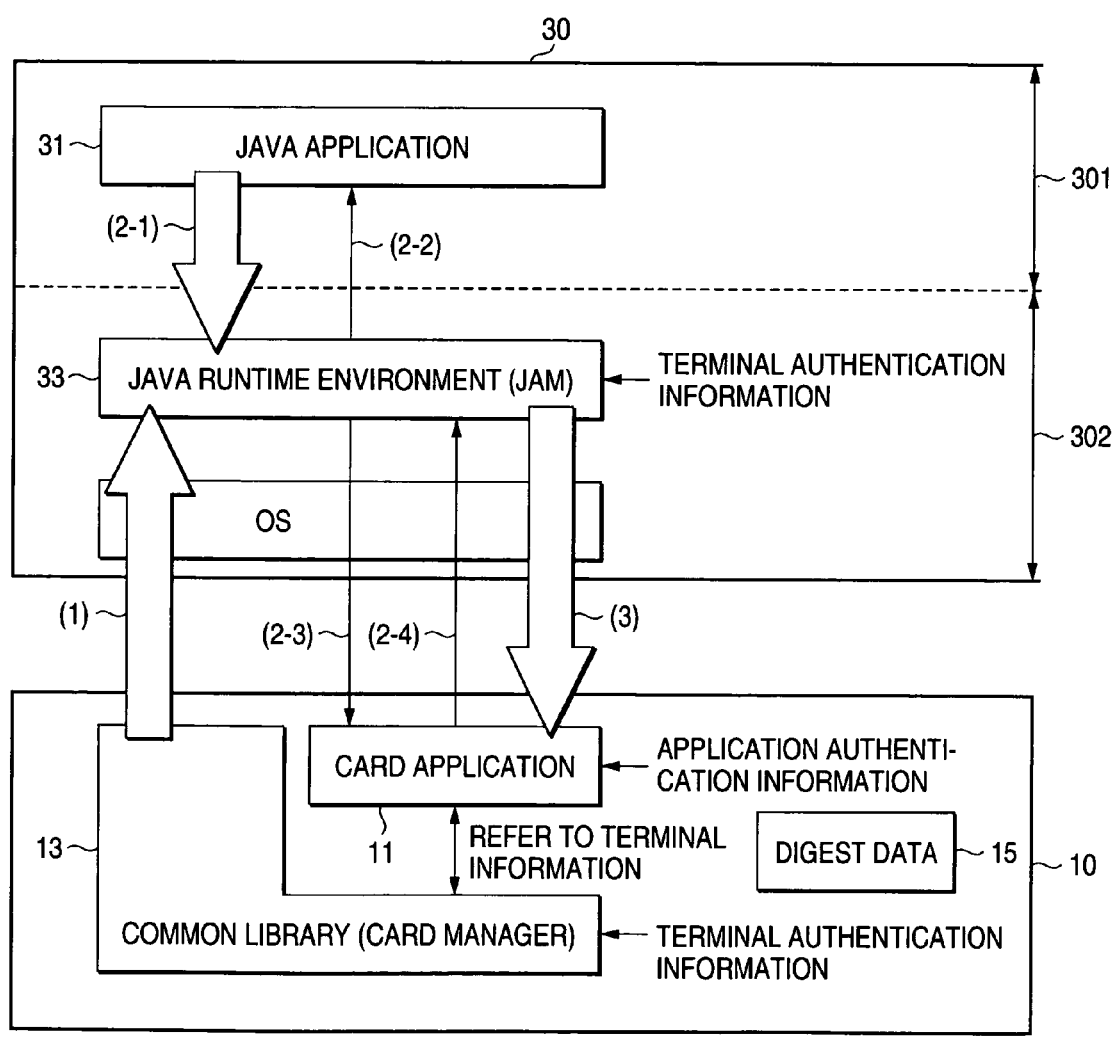
FIG. 3 is a block diagram showing procedures of an application authentication system according to a second embodiment of the present invention.

Authenticating procedures in this system are shown in FIG. 3 by arrows.

When the secure device 10 is fitted to the mobile terminal device 30, the card manager 13 of the secure device 10 executes the cross authentication process with the JAM 33 of the mobile terminal device 30 (1), like the first embodiment (FIG. 1). If the cross authentication is established, the card manager 13 sets the cross authentication path flag indicating the success in the secure device 10. Also, if the cross authentication is established, the JAM 33 of the mobile terminal device 30 starts a function of accessing to the secure device 10 and also the Java (registered trademark) application 31 requests the access to the secure device 10 of the JAM 33 (2-1).

The JAM 33, when received this request, applies the Hash operation to the data of the Java (registered trademark) application 31 to generate the digest data (2-2), and presents the digest data to the card application 11 of the secure device 10 (2-3). The card application 11 refers to the cross authentication path flag to check that the device authentication by the card manager 13 has been completed, then collates the digest data presented from the JAM 33 with the digest data 15 held secretly in the secure device 10, and then feeds back the authenticated result to the JAM 33 (2-4). The JAM 33, when knows that the Java (registered trademark) application 31 has been authenticated, executes the access request issued from the Java (registered trademark) application 31, and then transmits the command to the card application 11 (3).

In this manner, in this application authentication system, the electronic signature to the application is not needed (of course, such electronic signature may be provided), and thus the system can be simplified.

Also, in the system in which the operator attaches the signature, the operator's control cannot be eliminated. In contrast, in this system in which the electronic signature to the application is not needed, the business can be developed without the influence of the operator. Therefore, if the secure devices in which the authentication information of the application is embedded respectively are distributed the users after the system that makes it possible to download the application is prepared, it is possible to start immediately the service.

In this case, as the concrete method of the process (2-3) that is the process of presenting the data used to authenticate the application (digest data) from the application running means to the secure device, following methods will be considered. For instance, there are an approach of presenting the application authentication data in place of PIN by using the existing command verification used to collate the PIN, or the like, an approach of presenting the data by using the application authentication data instead of the secret key in Get Challenge and External Authenticate, which is the existing command for the challenge and response system used in the external authentication of the IC card, and so forth.

In the case of the latter, in the situation that a device B authenticates a device A in the ordinary challenge-response system, when Get Challenge serving as a trigger for the challenge-response process is transmitted from the device A to the device B, the device B sends back the first information as information held previously or information generated arbitrarily (random number, or the like) to the device A, then the device A encrypts the first information by using the secret key held previously (secret information A), or the like and then transmits the encrypted information to the device B (External Authenticate), then the device B decrypts the encrypted information by using the secret key held previously (secret information B: secret information corresponding to the secret information A) to decide whether or not decrypted information is in conformity with the first information. If this system is applied to the present invention, the device A corresponds to the application running means 33 and also the device B corresponds to the card application 11. In this case, because the device A does not have the area in which the data corresponding to the secret information A are held securely, the digest data that the application running means 33 generates instead of the secret information A and the digest data 15 that the secure device holds in advance instead of the secret information B can be employed respectively.

Third Embodiment

In a third embodiment of the present invention, an application authentication system in which the application running means that had the confidence of the secure device in the mobile terminal device authenticates the application with the electronic signature and then the secure device accepts this authenticated result will be explained hereunder.

Figure 6:
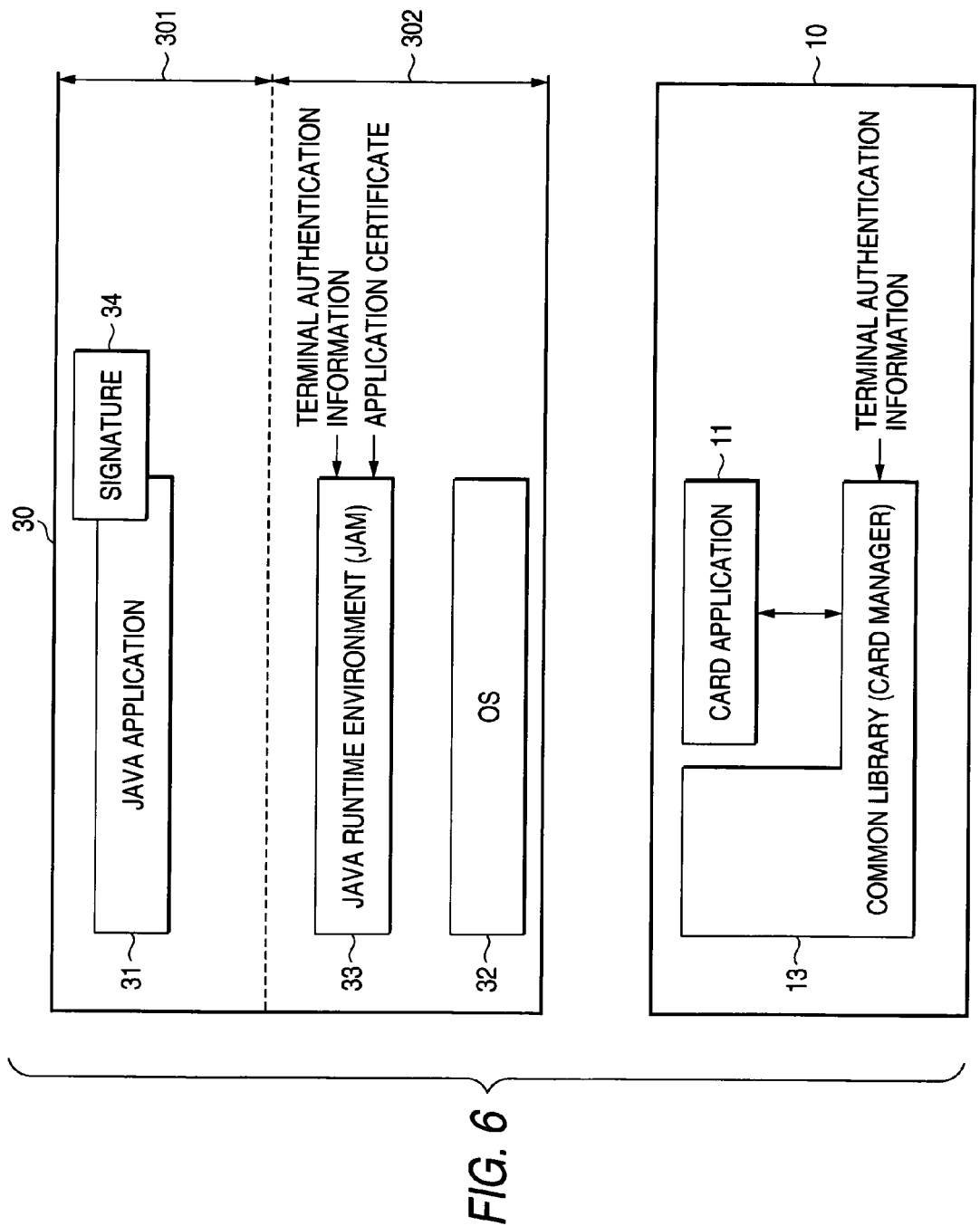
FIG. 6 is a block diagram showing a configuration of the application authentication system according to the third embodiment of the present invention.

FIG. 6 shows schematically the secure device 10 and the mobile terminal device 30 constituting this system. The secure device 10 has no signature verifying route certificate. Remaining configurations are not changed from the first embodiment.

Figure 5:
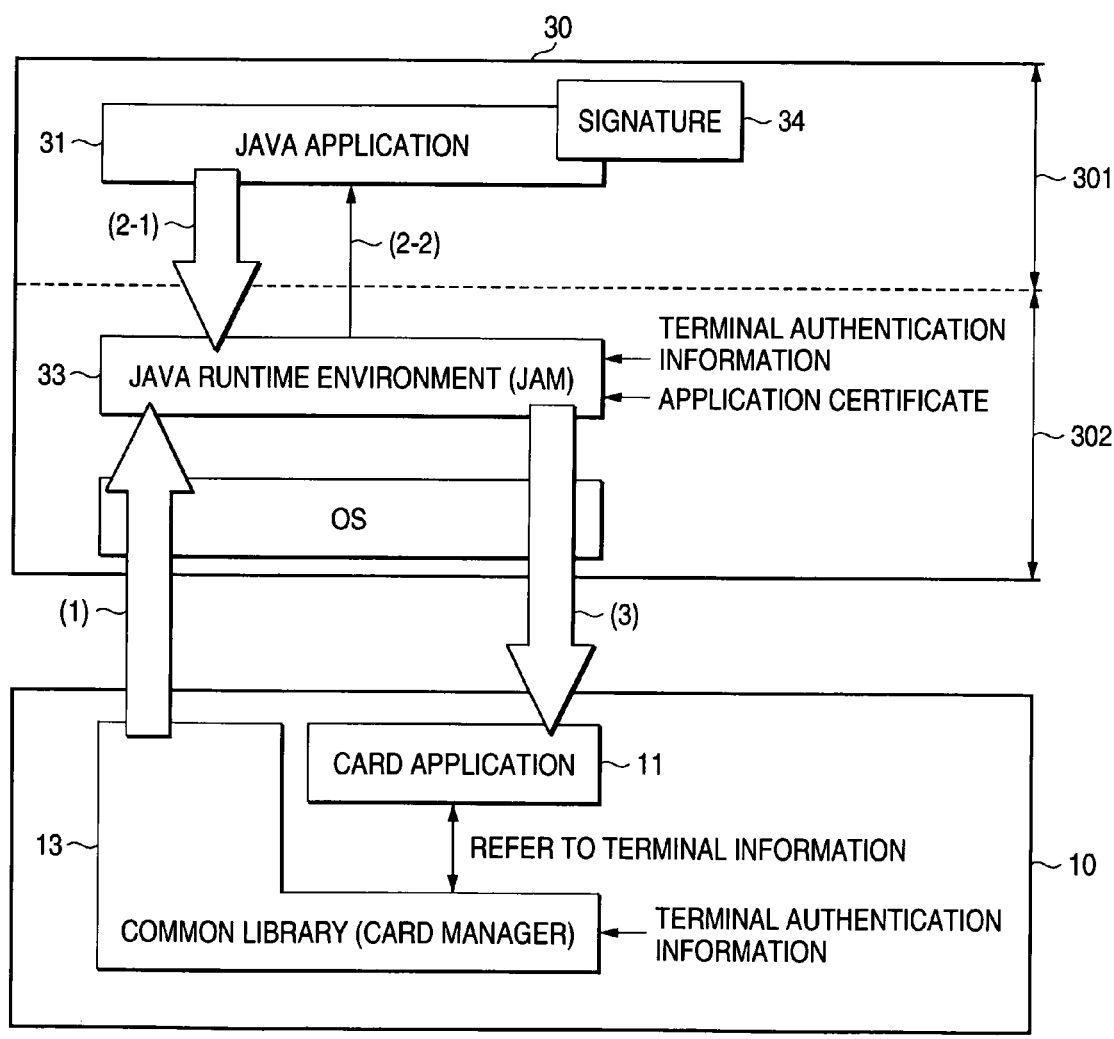
FIG. 5 is a block diagram showing procedures of an application authentication system according to a third embodiment of the present invention.

Authenticating procedures in this system are shown in FIG. 5 by arrows.

When the secure device 10 is fitted to the mobile terminal device 30, the card manager 13 of the secure device 10 executes the cross authentication process with the JAM 33 of the mobile terminal device 30 (1), like the first embodiment (FIG. 1). If the cross authentication is established, the card manager 13 sets the cross authentication path flag indicating the success in the secure device 10. Also, if the cross authentication with the secure device 10 is established, the JAM 33 of the mobile terminal device 30 starts a function of accessing to the secure device 10 and also the Java (registered trademark) application 31 requests the access to the secure device 10 of the JAM 33 (2-1). The JAM 33, when accepts this request, verifies the electronic signature 34 of the Java (registered trademark) application 31 by using the public key contained in the application certificate to thus authenticate the Java (registered trademark) application 31 (2-2). This authentication process of the Java (registered trademark) application 31 by the JAM 33 is identical to that explained in the first embodiment.

The JAM 33, when authenticated the Java (registered trademark) application 31, executes the access request issued from the Java (registered trademark) application 31 and then transmits the command to the card application 11 (3). The card application 11 of the secure device 10 confirms the fact that the device authentication by the card manager 13 is completed by using the cross authentication path flag, and then accepts the command.

In this manner, when the secure device of this application authentication system authenticates the Java (registered trademark) runtime environment (application running means) stored in the unwritable area of the mobile terminal device by the cross authentication with the mobile terminal device, such secure device trusts the authenticated result of the application with the electronic signature executed by the application running means and authenticates this application.

In this application authentication system, the existing system stipulating the scheme of attaching the signature to the application (J2SE, or the like) can be utilized as it is. Also, the system for attaching the signature to the application by using such scheme can be shifted without trouble to the system in this embodiment. Also, in contrast with the case of the second embodiment, the main person such as the operator having the right to affix the signature to the application can control the business in this system.

Figure 7:
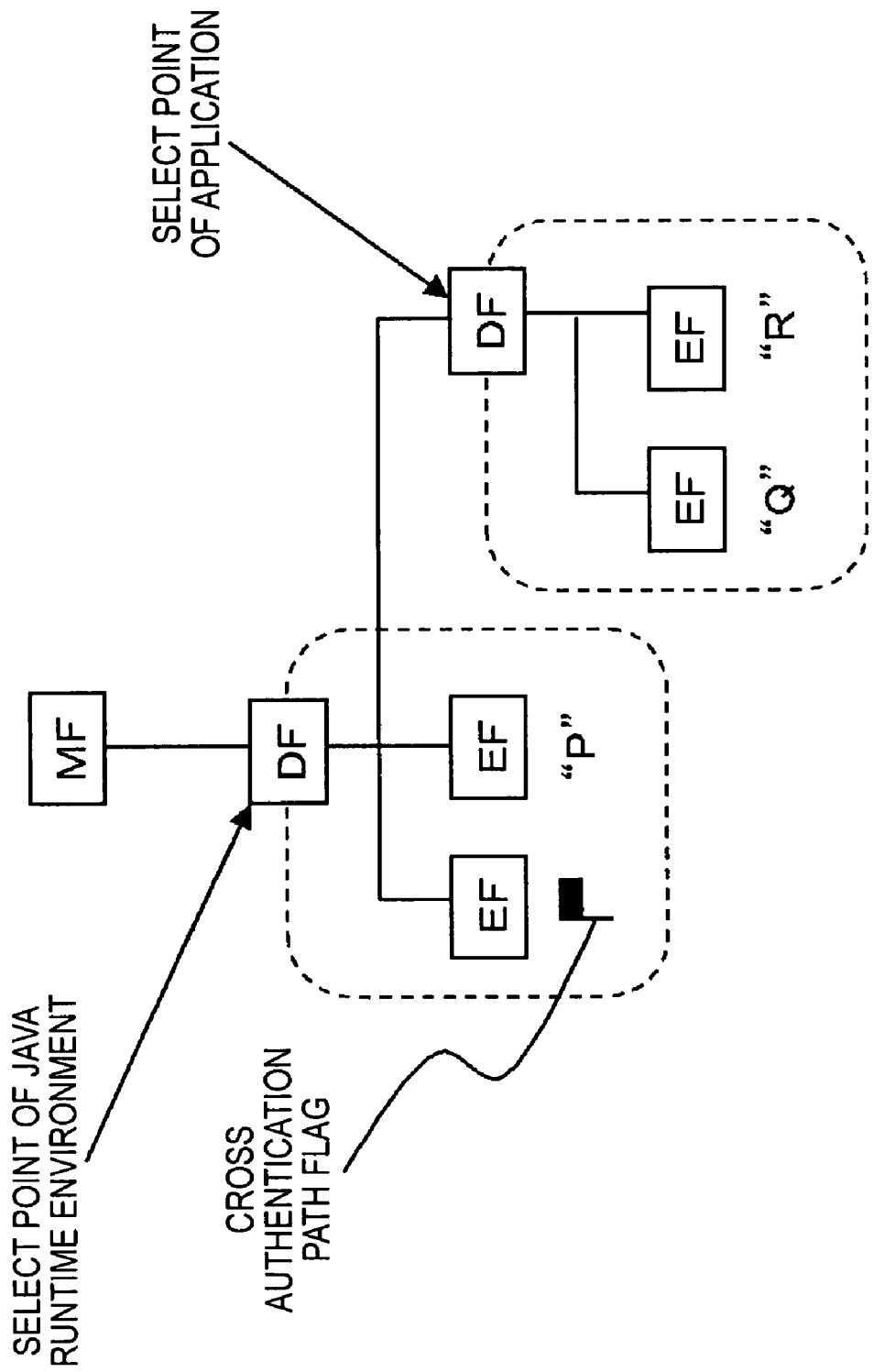
FIG. 7 is a schematic diagram showing file access in a file application-type secure device in embodiments of the present invention.

In this case, as shown in respective embodiments, there are a program application-type secure device in which the card application controls the access to the stored data and a file application-type device in which security conditions required to access the stored file are decided, as the secure device. In the secure device of the latter, as shown in FIG. 7, when the Java (registered trademark) runtime environment passes the authentication of the card manager, such secure device can access subsidiary EF (Elementary File) of DF (Dedicated File) that the Java runtime environment selects. Also, when the application is authenticated by the system in respective embodiments, the security conditions can be set in such a manner that the secure device can access subsidiary EF of DF that the application selects.

In this case, it does not say definitely that, even after the secure device authenticated the application running means, the malicious person cannot set himself or herself up as the application running means to send the instruction to the secure device like the signal issued from the application running means via a port of the secure device positioned at the portion fitted to the terminal device. In such case, it is more preferable that, in order to prevent this fake, the system capable of confirming that the instruction is issued surely from the application running means should be provided. As such system, following systems may be considered.

In other words, in the process (1) in which the card manager 13 authenticates the application running means 33, any information may be transmitted from the card manager 13 to the application running means 33 such that both means possess the information commonly, or the information is stored if the common information are held (or generated) in both means. If this information is assumed as the second information, such second information is also added in the process (3) in which the access request is issued from the application running means 33 to the card application 11. The card application 11 accepts only the request in which the second information is added to the received access request. However, unless the second information is added, the card application 11 regards such access as the improper access such as the fake, or the like and does not accept the process. Here, the wording "to add the second information" signifies to add the second information to the access request, or to encrypt full information or a part of information of the access request as it is or after it is worked.

As apparent from the above explanation, according to the application authentication system of the present invention, it is feasible to authenticate the application executed on the terminal device, which does not have a secure information concealing area, by the secure device. Therefore, the application on the terminal device can access the data in the secure device being fitted to the terminal device, and thus a high-level process can be carried out.

What is claimed is:

1. An application authentication system comprising:
a terminal device on which an application is operated; and
a secure device connected fixedly or detachably to the terminal device,
wherein the terminal device includes:
a memory comprising an application recording unit configured to record the application which is operated on the terminal device and performs processing using data held by the secure device; and
application running unit configured to run the application,
wherein the secure device includes:
another memory comprising a data holding unit configured to hold the data used by the application which is operated on the terminal device;
verifying unit configured to verify validity of the application running unit and validity of the application; and
accepting unit configured to accept access from the application to the data held in the data holding unit when the validities of the application running unit and the application are authenticated,
wherein the application running unit calculates digest data of the application and sends the digest data to the verifying unit after the validity of the application running unit is authenticated by the verifying unit, and
wherein the verifying unit verifies the validity of the application using the transmitted digest data.

2. A secure device connected fixedly or detachably to a terminal which includes application running unit configured to run an application, the secure device comprising:
a memory comprising a data holding unit configured to hold data used by the application;
verifying unit configured to verify validity of the application running unit and validity of the application; and
accepting unit configured to accept access from the application to the data held in the data holding unit when the validities of the application running unit and the application are authenticated,
wherein the application running unit of the terminal calculates digest data of the application and sends the digest data to the verifying unit after the validity of the application running unit is authenticated by the verifying unit, and
wherein the verifying unit verifies the validity of the application using the transmitted digest data.

3. The secure device according to claim 2, wherein
an electronic signature is attached to the application by a certificate authority,
the application running unit transmits the electronic signature attached to the application to the secure device,
the verifying unit verifies the electronic signature by using a pubic key of the certificate authority and the digest data, and authenticates the application when a result of the verification is normal.

4. The secure device according to claim 2, wherein the verifying unit holds the digest data of the application in advance, collates the held digest data and the transmitted digest data, and authenticates the application when the result of the collation is normal.

5. A terminal connected fixedly or detachably to a secure device which holds data used by an application operated on the terminal, verifies validity of running unit configured to run the application, verifies validity of the application using digest data of the application calculated by the running unit, validity of which is authenticated, accepts access by the application to the data when the validities of the running unit and the application are authenticated, the terminal comprising:
the running unit configured to run the application;
a memory comprising an application recording unit configured to record the application which is operated on the terminal and performs processing using the data held by the secure device; and
recording unit configured to record the running unit which runs the application,
wherein the running unit calculates the digest data of the application and sends the digest data to the secure device when the running unit is authenticated by the secure device.

6. The terminal according to claim 5, wherein the running unit calculates the digest data after the application requests to use the data held by the secure device.

7. The terminal according to claim 5, wherein the running unit is recorded in an unwritable area in the terminal, in which information are never rewritten by the operation on the terminal device, and the access from an external device.

8. An authenticating method used in a secure device, comprising a memory, and that is fixedly or detachably connected to a terminal which includes running unit configured to running an application, the method comprising:
providing, in the secure device, data holding unit configured to hold data used by the application which is operated on the terminal, verifying unit configured to perform authentication, and accepting unit configured to accept access to the data;
verifying validity of the running unit by the verifying unit;
calculating digest data of the application and transmitting the digest data to the verifying unit if the validity of the running unit is authenticated by the verifying unit;
verifying validity of the application on the terminal by the verifying unit using the transmitted digest data; and
accepting, by the accepting unit, access from the application to the data held by the data holding unit when the validities of the running unit and the application are authenticated.

9. An application authentication system comprising:
a secure device for managing data used by an application, the secure device comprising a memory; and
running unit configured to run a Basic Input Output System (BIOS), an Operating System (OS) operated on the BIOS, executing software operated on the OS and executing the application, and the application,
wherein the secure device verifies validity of the BIOS, wherein the BIOS verifies validity of the OS after the verification by the secure device, wherein the OS verifies validity of the executing software after the verification by the BIOS, wherein the executing software performs at least a part of processing of verifying validity of the application after the verification by the OS, and wherein the secure device allows the application to use the data after the validity of the application is verified.

10. The application authentication system according to claim 9, wherein the application transmits a command to the secure device after the validity of the application is verified by the executing software, and the secure device accepts the command only when the verification of the validity of the application is successful.

11. The application authentication system according to claim 9, wherein the executing software transmits information including a Hash of the application to the secure device, and the secure device verifies validity of the information including the Hash of the application.

12. A method used in a system having a secure device for managing data used by an application and comprising a memory, and running unit configured to run a Basic Input Output System (BIOS), an Operating System (OS) operated on the BIOS, executing software operated on the OS and executing the application, and the application, the method comprising:

verifying validity of the BIOS by the secure device;

verifying validity of the OS by the BIOS after the verification by the secure device;

verifying validity of the executing software by the OS after the verification by the BIOS;

performing at least a part of processing of verifying validity of the application by the executing software after the verification by the OS; and allowing the application to use the data by the secure device after the validity of the application is verified.

* * * * *